(12) United States Patent
Kanawa

(10) Patent No.: US 9,147,007 B2
(45) Date of Patent: Sep. 29, 2015

(54) QUERY EXPRESSION CONVERSION APPARATUS, QUERY EXPRESSION CONVERSION METHOD, AND COMPUTER PROGRAM PRODUCT

(75) Inventor: Takuya Kanawa, Kanagawa (JP)

(73) Assignees: Kabushiki Kaisha Toshiba, Tokyo (JP); Toshiba Solutions Corporation, Tokyo (JP)

(*) Notice: Subject to any disclaimer, the term of this patent is extended or adjusted under 35 U.S.C. 154(b) by 504 days.

(21) Appl. No.: 13/218,619

(22) Filed: Aug. 26, 2011

(65) Prior Publication Data

US 2012/0136884 A1 May 31, 2012

(30) Foreign Application Priority Data

Nov. 25, 2010 (JP) ................................. 2010-262178

(51) Int. Cl.
*G06F 7/00* (2006.01)
*G06F 17/30* (2006.01)

(52) U.S. Cl.
CPC ...... *G06F 17/3092* (2013.01); *G06F 17/30932* (2013.01)

(58) Field of Classification Search
None
See application file for complete search history.

(56) References Cited

U.S. PATENT DOCUMENTS

| 7,016,915 | B2 * | 3/2006 | Shanmugasundaram et al. | 707/713 |
| 7,664,773 | B2 * | 2/2010 | Hattori et al. | 707/796 |
| 7,822,788 | B2 * | 10/2010 | Kanawa | 707/811 |
| 7,974,966 | B2 * | 7/2011 | Robie | 707/713 |
| 2006/0101058 | A1 * | 5/2006 | Chidlovskii | 707/102 |
| 2006/0136452 | A1 * | 6/2006 | Lim et al. | 707/101 |
| 2007/0219959 | A1 * | 9/2007 | Kanemasa | 707/3 |
| 2008/0082505 | A1 * | 4/2008 | Kokubu et al. | 707/3 |
| 2008/0294604 | A1 * | 11/2008 | Goswami | 707/3 |
| 2009/0019007 | A1 * | 1/2009 | Niina | 707/3 |
| 2009/0132544 | A1 * | 5/2009 | Hattori | |

(Continued)

FOREIGN PATENT DOCUMENTS

| JP | 2001-092844 | 4/2001 |
| JP | 2003-316783 | 11/2003 |

(Continued)

OTHER PUBLICATIONS

Japanese Office Action for Japanese Application No. 2010-262178 mailed on Jul. 31, 2012, english portion only.
First Office Action for Chinese Patent Application No. 201110255578.8 Dated Dec. 17, 2013, 6 pgs, english portion only.

*Primary Examiner* — Robert Beausoliel, Jr.
*Assistant Examiner* — Michael Pham
(74) *Attorney, Agent, or Firm* — Amin, Turocy & Watson, LLP

(57) ABSTRACT

A query expression conversion apparatus includes a first generating unit, a first storage unit, an input unit, a conversion unit, and an output unit. The first generating unit periodically acquires structured data from a data set, analyzes the acquired structured data, and generates structural information of the data set. The first storage unit stores the structural information generated by the first generating unit so as to be associated with the unique address of the data set. The input unit inputs the unique address of the data set to be queried and the query expression having the structure of data as a condition. The conversion unit converts the query expression input from the input unit so as to be suitable for the structural information corresponding to the unique address of the data set input from the input unit. The output unit outputs a converted query expression converted by the conversion unit.

10 Claims, 11 Drawing Sheets

(56) References Cited

U.S. PATENT DOCUMENTS

2009/0222458 A1* 9/2009 Hattori .................... 707/10
2011/0125730 A1* 5/2011 Bordawekar et al. ......... 707/718
2012/0102025 A1 4/2012 Hattori

FOREIGN PATENT DOCUMENTS

| JP | 2007-257083 | 10/2007 |
| JP | 2012-093829 | 5/2012 |

* cited by examiner

FIG.1

```
<PATENT_ID = "3">
 <TITLE> STRUCTURED DOCUMENT SEARCH APPARATUS </TITLE>
 <INVENTOR_LIST>
  <INVENTOR>
   <LAST_NAME> TANAKA </LAST_NAME>
   <FIRST_NAME> ICHIRO </FIRST_NAME>
  </INVENTOR>
  <INVENTOR>
   <LAST_NAME> SUZUKI </LAST_NAME>
   <FIRST_NAME> JIRO </FIRST_NAME>
  </INVENTOR>
 </INVENTOR_LIST>
 <EFFECT> INCREASE SEARCH SPEED OF STRUCTURED DOCUMENT WITH TAG </EFFECT>
 <KEYWORD_LIST>
  <KEYWORD> XML </KEYWORD>
  <KEYWORD> STRUCTURED DOCUMENT </KEYWORD>
  <KEYWORD> DATABASE </KEYWORD>
 </KEYWORD_LIST>
</PATENT>
```

FIG.2
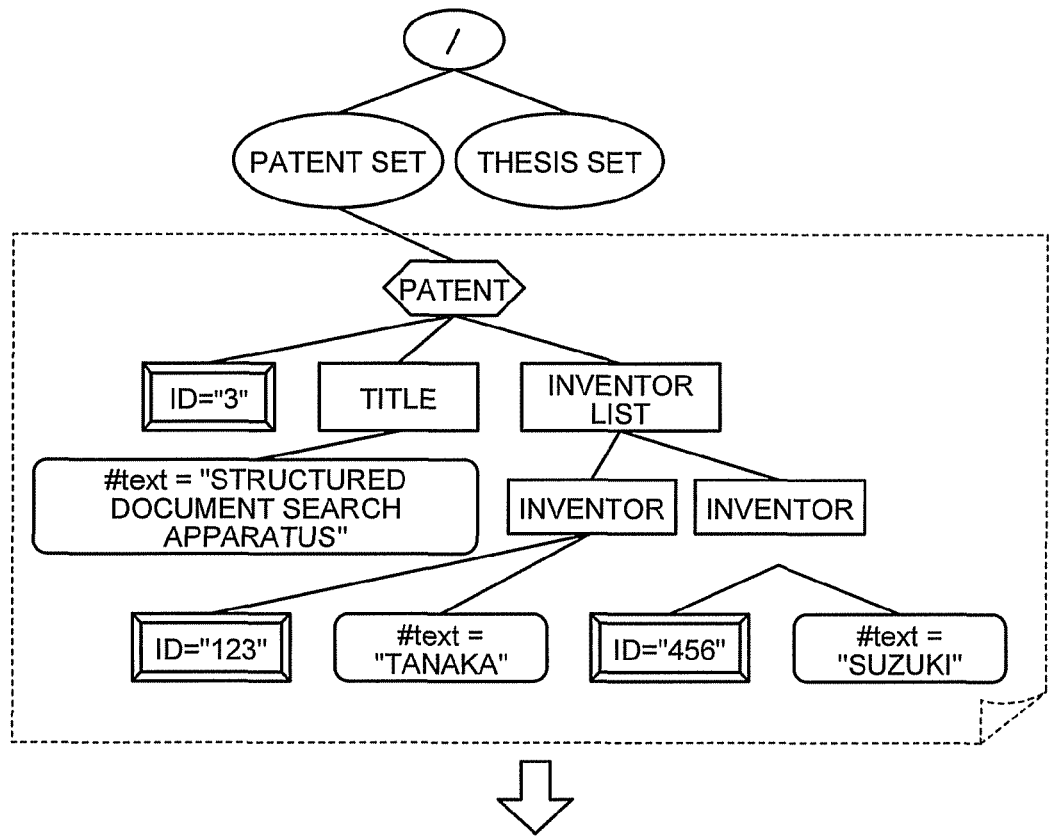
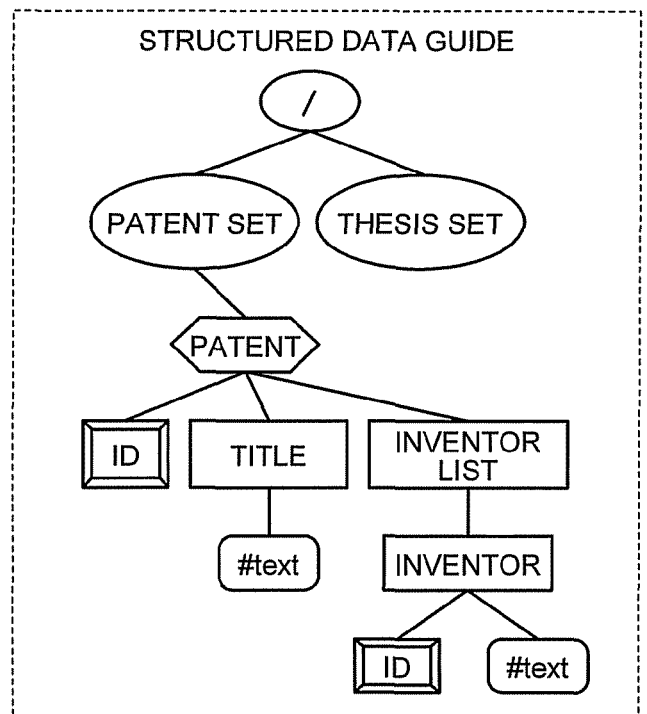

FIG.3
STRUCTURED DATA GUIDE 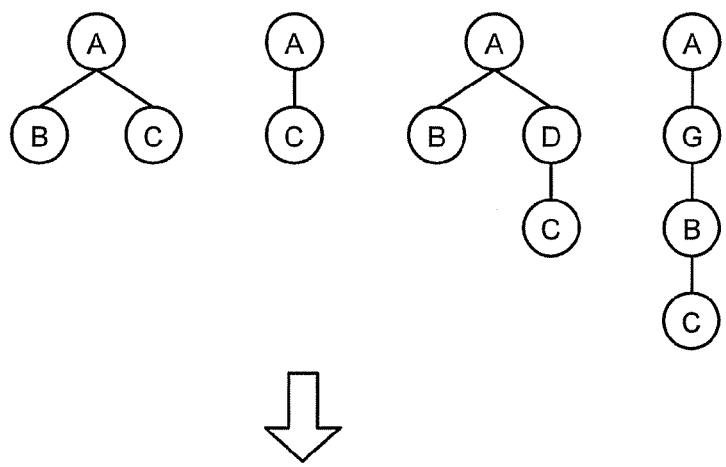
SYNTHESIZED STRUCTURED DATA GUIDE 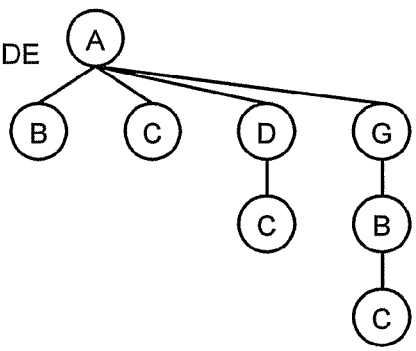

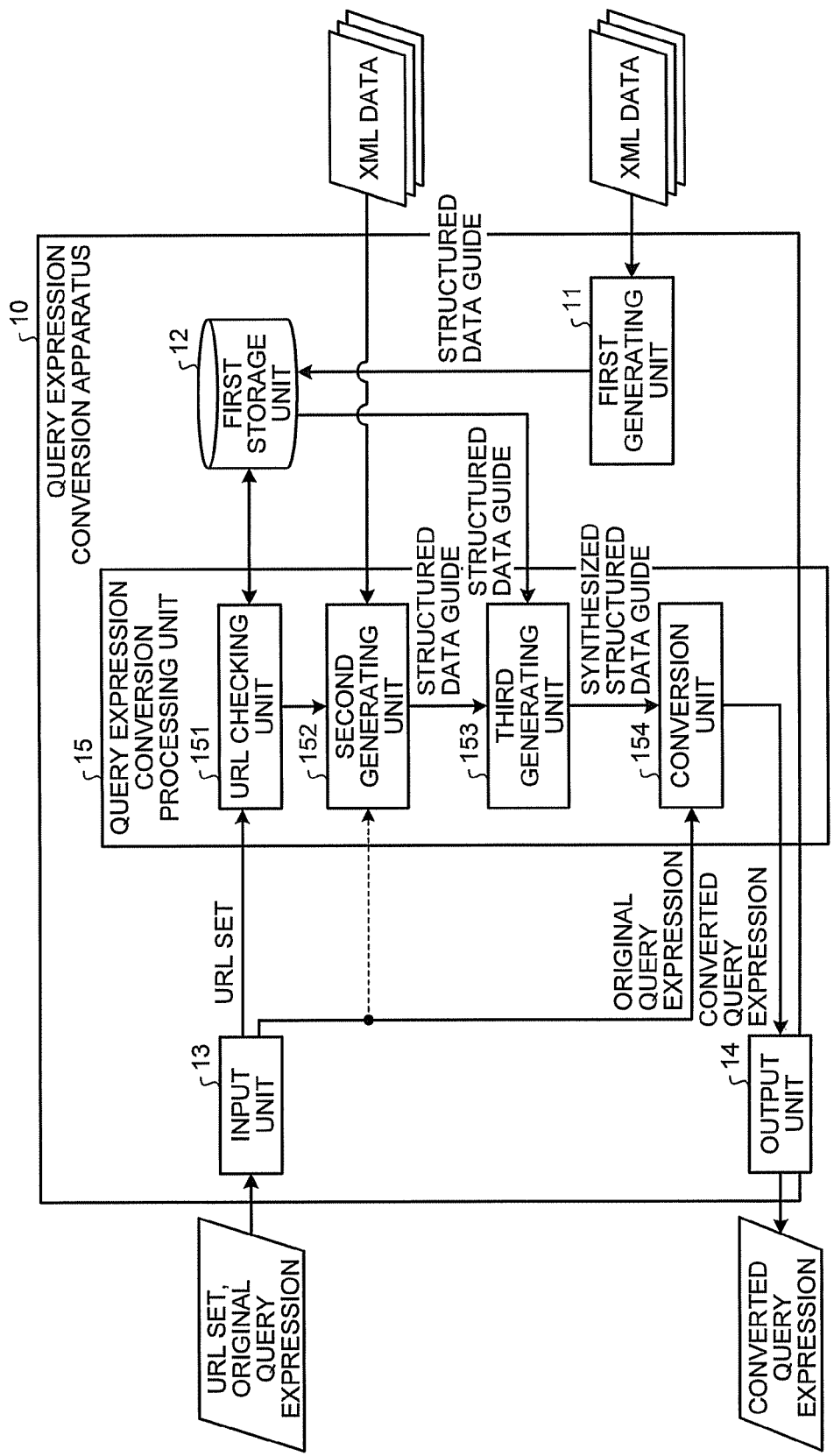

FIG.6A   QUERY EXPRESSION A

```
for $x in URL1/BOOK
where contains ($x/TITLE, "SEARCH")
return <result> {$x/HEADER/TITLE}</result>
```

FIG.6B

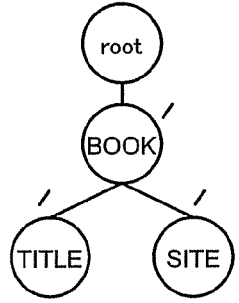

FIG.6C

DOCUMENT 1
```
<BOOK>
  <HEADER>
    <TITLE> STRUCTURED DOCUMENT SEARCH APPARATUS </TITLE>
  </HEADER>
</BOOK>
```

DOCUMENT 2
```
<book>
  <title> SEARCH SYSTEM </title>
</book>
```

DOCUMENT 3
```
<book>
  <WRITER> ICHIRO TANAKA </WRITER>
</book>
```

FIG.6D   RELAXATION QUERY EXPRESSION A'

```
for $x in URL1/*
where contains ($x//text(),"SEARCH")
return $x
```

FIG.6E

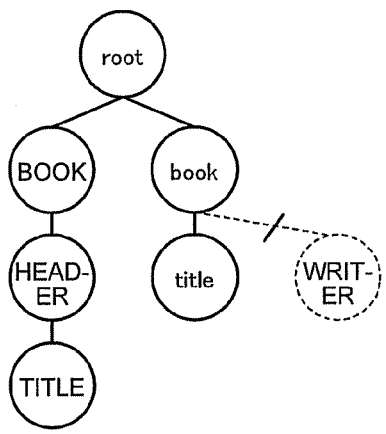

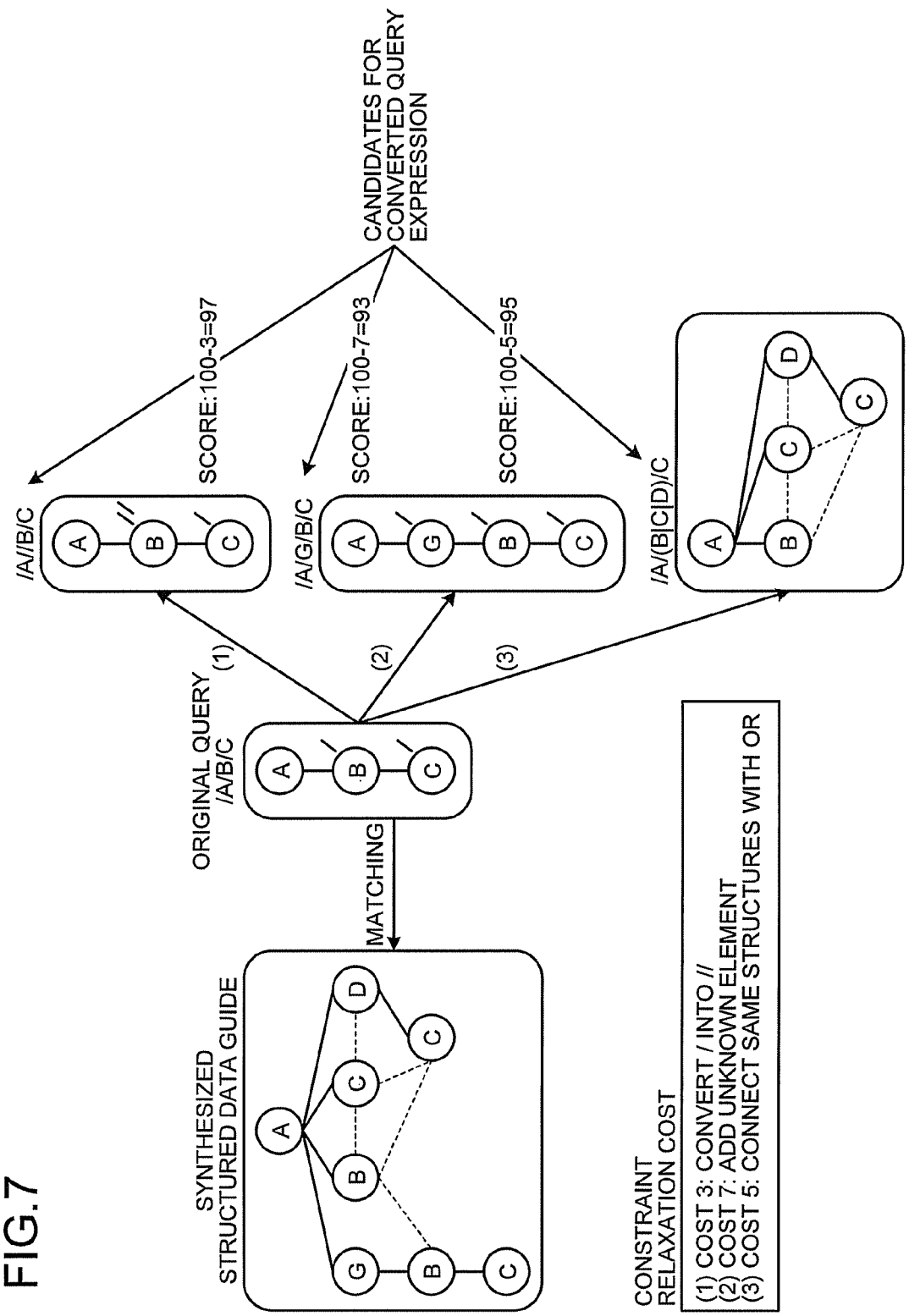

QUERY EXPRESSION CONVERSION APPARATUS, QUERY EXPRESSION CONVERSION METHOD, AND COMPUTER PROGRAM PRODUCT

CROSS-REFERENCE TO RELATED APPLICATIONS

This application is based upon and claims the benefit of priority from Japanese Patent Application No. 2010-262178, filed on Nov. 25, 2010; the entire contents of which are incorporated herein by reference.

FIELD

Embodiments described herein relate generally to a query expression conversion apparatus, a query expression conversion method, and a computer program product.

BACKGROUND

An Extensible Markup Language (XML), which is a general-purpose data description language, is characterized in that it can have a structure in which structured data and unstructured data are mixed in one document, it is easily processed by a computer, and it can improve readability. Therefore, the XML has been widely spread as a common data format to various kinds of computerized data. The computerized data (hereinafter, referred to as XML data) described with the XML is structured data in which elements with tags (marked up) are represented by a tree structure.

In recent years, since a large amount of XML data is used, an XML database that is suitable to store and appropriately manage the XML data has been developed. In addition, an integrated search technique has been developed, which searches a plurality of XML databases (data sets of XML data) distributed over the network like one database using a query expression described with XQuery which is a standard query language.

A problem of the integrated search is the difference in the schema (data structures of XML data) among a plurality of XML databases to be integrated. Since the XML database does not need to define the schema, it has high flexibility and expandability capable of responding to various kinds of XML data. However, in some cases, the data structure of the stored XML data varies depending on the database. Therefore, even when a query expression common to a plurality of XML databases to be integrated is performed, XML data suitable for search conditions is hit in a certain XML database, but XML data that should be semantically suitable is not hit due to the difference in data structure in another XML database. In particular, when XQuery is used as the query language, this tendency is strong since strict matching having a structure or a vocabulary as a condition is basically required.

As a method of absorbing the difference in the schema among a plurality of databases and performing an integrated search with a common query expression, a method has been known in which a master server that converts the common query expression into a query expression suitable for each of the plurality of databases is provided on the network. In general, a query expression conversion rule is defined in advance for each database to be integrated and is stored in the master server. Then, when a common query expression is input to the master server, the master server converts the common query expression so as to be suitable for the schema of each of a plurality of databases to be integrated and a query is performed for each database.

BRIEF DESCRIPTION OF THE DRAWINGS

FIG. 1 is a diagram illustrating an example in which information related to a "patent" is described with an XML;

FIG. 2 is a diagram illustrating a structured data guide;

FIG. 3 is a conceptual diagram illustrating an aspect of the generation of a synthesized structured data guide;

FIG. 5 is a functional block diagram illustrating the functional structure of a query expression conversion apparatus according to a first embodiment;

FIGS. 6A to 6E are diagrams illustrating an example of a process of generating a structured data guide for an database which schema is unknown using a query expression obtained by relaxing the conditions of the original query expression;

FIG. 7 is a diagram illustrating an example of the process of a conversion unit;

DETAILED DESCRIPTION

Figure 4:
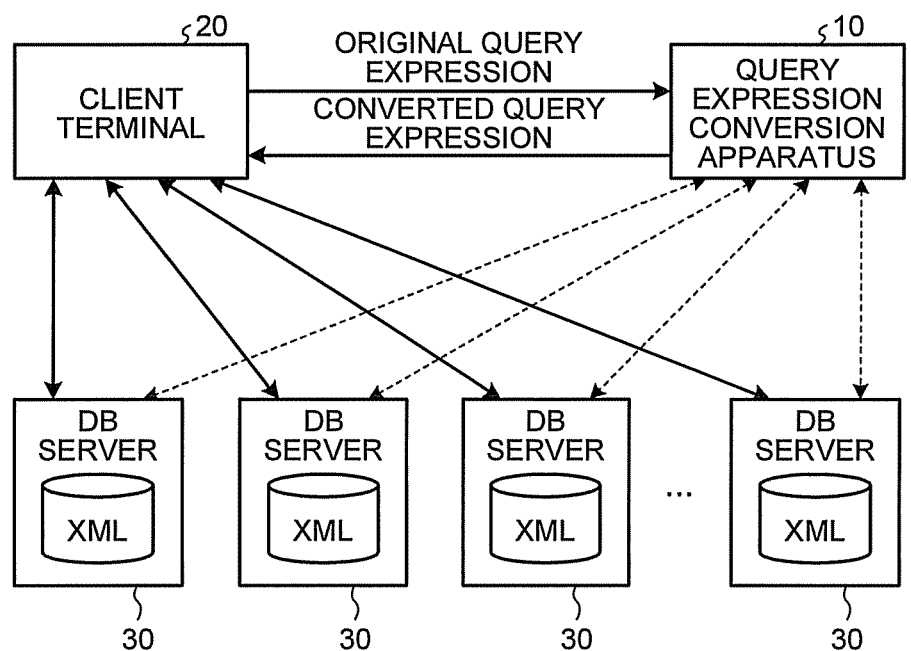
FIG. 4 is a system configuration diagram schematically illustrating the overall structure of an integrated search system.

A query expression conversion method according to the related art has problems in that it is necessary to define a conversion rule according to the schema of each database to be integrated in advance and the method cannot correspond to a database of which schema is unknown.

A query expression conversion apparatus according to an embodiment converts a query expression for a data set that stores structured data. The query expression conversion apparatus according to the embodiment includes a first generating unit, a first storage unit, an input unit, a conversion unit, and an output unit. The first generating unit periodically acquires the structured data from the data set, analyzes the acquired structured data, and generates the structural information of the data set. The first storage unit stores the structural information generated by the first generating unit so as to be associated with the unique address of the data set. The input unit inputs the unique address of the data set to be queried and a query expression having the structure of data as a condition. The conversion unit converts the query expression input from the input unit so as to be suitable for the structural information corresponding to the unique address of the data set input from the input unit. The output unit outputs a converted query expression converted by the conversion unit.

(First Embodiment)

A query expression conversion apparatus according to a first embodiment is a server on a network. The query expression conversion apparatus converts a query expression input from a client terminal on the network into a query expression suitable for each database, which is a data set to be queried on the network, and outputs the converted query expression to the client terminal. It is assumed that each database on the network stores XML data, which is structured data. In addition, it is assumed that the query expression input from the client terminal is a query expression having the structure of data as a condition, specifically, a query expression described with XQuery.

First, the XML that is used as the common format of data stored in each database to be queried will be described.

FIG. 1 illustrates an example in which information about a "patent" is described with the XML. In the XML, a tag (element) is used to represent a document structure. The tags include a start tag and an end tag. The start tag and the end tag surround a structural element of document structural information to clearly describe a character string (text) delimiter in a document and the relationship between the text and the structural element including the text in terms of the structure.

The start tag includes symbols "<" and ">" having an element name put therebetween. The end tag includes symbols "</" and ">" having an element name put therebetween. The content of the structural element following the tag is a repetition of text (character strings) or child structural elements. In addition, attribute information, such as "<element name attribute='attribute value'>", may be set to the start tag. A structural element that does not include text, such as "<patent_DB></patent_DB>", may be simply represented by "<patentDB/>".

In the document illustrated in FIG. 1, an element starting from a "patent" tag is a document root (root) and there is an element set of child elements starting from "title", "inventor_list", "effect", and "keyword_list" tags. In addition, there is one text (character string) "structured document search device" in the element starting from the "title" tag.

Next, a structured data guide, which is characteristic structural information, in each database to be queried will be described. As illustrated in FIG. 2, in the structured data guide, elements having the same tag names in the same structure are integrated into one data structure and the hierarchical structure of the XML is abstractly represented. In the example illustrated in FIG. 2, the structured data guide is generated in which there is a plurality of inventor tags with the same structure and the inventor tags are integrated. The structured data guide is generated for each document. When there is a plurality of documents, first, the structured data guide for one document is generated. Then, the generated structured data guide and the structured data guides that have been generated until now are superposed to update the structured data guide. That is, a plurality of XML data items is extracted from one database, the structure of the data items is analyzed to sequentially generate the structured data guide, and the structured data guide is updated. In this way, it is possible to obtain the structured data guide, which is the characteristic structural information, in the database. The structured data guide virtually represents the schema of the database.

As described above, when the structured data guides generated for each database are synthesized between a plurality of databases, it is possible to obtain a synthesized structured data guide, which is a virtual schema when a plurality of databases is integrated (integrated database). FIG. 3 is a conceptual diagram illustrating an aspect in which a plurality of structured data guides is synthesized to generate a synthesized structured data guide. FIG. 3 simply illustrates an example in which the structured data guides of four databases are synthesized to generate one synthesized structured data guide. As illustrated in FIG. 3, in the synthesized structured data guide, portions having a common structure in the original structured data guides are represented by one node.

FIG. 4 is a system configuration diagram schematically illustrating the overall structure of an integrated search system using the query expression conversion apparatus according to the first embodiment. The integrated search system includes a query expression conversion apparatus 10 according to the first embodiment, a client terminal 20 that receives a service provided by the query expression conversion apparatus 10, and a plurality of DB servers (XML databases) 30. The integrated search system is formed by connecting these components through a network.

The client terminal 20 outputs a plurality of URLs, which is the unique addresses of the plurality of DB servers 30 to be queried on the network, and the query expression (original query expression), described with XQuery, to the query expression conversion apparatus 10. In addition, the client terminal 20 outputs a converted query expression obtained by converting the original query expression using the query expression conversion apparatus 10 to each of the plurality of DB servers 30 to be queried. Then, the client terminal 20 acquires the search result which is output from each of the DB servers 30 in response to the converted query expression.

The client terminal 20 may be a terminal (user terminal) used by the user, such as a personal computer, or a coordinator server that coordinates the plurality of DB servers 30. When the coordinator server that coordinates the plurality of DB servers 30 is provided on the network, the coordinator server receives the original query expression and the URL of each of the plurality of DB servers 30 to be queried from the user terminal and outputs them to the query expression conversion apparatus 10. Then, the query expression conversion apparatus 10 outputs a converted query expression to the plurality of DB servers 30 to be queried, acquires the search result from each of the DB servers 30, and outputs the search result to the user terminal. Thus, the coordinator server serves as the client terminal 20 in the relationship with the query expression conversion apparatus 10.

The DB server 30 manages the database that stores XML data, searches the database using the input query expression, and outputs the search result as a response to the query expression. Each of the DB servers 30 on the network is identified by a URL, which is a unique address on the network. The plurality of DB servers 30 forming the integrated search system includes a DB server whose URL has been registered in the query expression conversion apparatus 10 and a DB server whose URL has not been registered in the query expression conversion apparatus 10. The DB server whose URL has been registered in the query expression conversion apparatus 10 is a known DB server for the query expression conversion apparatus 10. The DB server whose URL has not been registered in the query expression conversion apparatus 10 is an unknown DB server for the query expression conversion apparatus 10.

FIG. 5 is a functional block diagram illustrating the detailed functional structure of the query expression conversion apparatus 10 according to the first embodiment. The query expression conversion apparatus 10 includes a first generating unit 11, a first storage unit 12, an input unit 13, an output unit 14, and a query expression conversion processing unit 15. The query expression conversion processing unit 15 includes a URL checking unit 151, a second generating unit 152, a third generating unit 153, and a conversion unit 154.

The first generating unit 11 periodically performs crawling on the known DB server 30 whose URL has been registered and generates a structured data guide, which is the structural information of the known DB server 30. Specifically, the first generating unit 11 periodically performs the query expression which certainly matches all data items from the root, such as /* which is a simple path expression of XQuery, on all of the DB servers 30 whose URLs have been registered, thereby acquiring XML data stored in the database from each of the DB servers 30. Then, the first generating unit 11 analyzes the acquired XML data, periodically generates the structured data guide (see FIG. 2), which is the characteristic structural information (virtual schema) of the database managed by each DB server 30, and stores the generated structured data guide in the first storage unit 12 so as to be associated with the URL of each DB server 30. If the DB server 30 discloses the structured data guide to the outside in advance, the first generating unit 11 may acquire the disclosed structured data guide, instead of acquiring the XML data from the DB server 30 and generating the structured data guide.

The first storage unit 12 is a memory that stores the structured data guide for the known DB server 30 which is generated by the periodic crawling by the first generating unit 11 so as to be associated with the URL, which is the unique address, of the DB server 30. As described above, since the first generating unit 11 periodically performs crawling on the known DB server 30, the structured data guide corresponding to each URL is periodically updated and the latest structured data guide is stored in the first storage unit 12.

The input unit 13 receives the URLs (URL set) of the plurality of DB servers 30 to be queried, which are output from the client terminal 20, and the original query expression described with XQuery. Then, the input unit 13 transmits the input URL set to the URL checking unit 151 and transmits the input original query expression to the conversion unit 154.

The conversion unit 154 converts the original query expression into a query expression and the output unit 14 acquires the converted query expression and outputs the converted query expression to the client terminal 20.

The URL checking unit 151 checks whether the structured data guide corresponding to each URL in the URL set input from the input unit 13 is stored in the first storage unit 12. When the URL corresponding to the structured data guide which is not stored in the first storage unit 12, that is, the URL of the unknown DB server 30 is included in the URL set input from the input unit 13, the URL checking unit 151 requests the second generating unit 152 to generate a structured data guide for the unknown DB server 30.

The second generating unit 152 performs a process of generating the structured data guide for the unknown DB server 30 according to the request from the URL checking unit 151. Specifically, the second generating unit 152 generates a query expression for the unknown DB server 30, analyzes N pieces of XML data items obtained from the unknown DB server 30 in response to the query expression, and generates the structured data guide for the unknown DB server 30. As the number N of XML data items obtained from the unknown DB server 30 increases, the accuracy (that is, the reproducibility of the schema) of the structured data guide to be generated is improved, but the processing time required for generation of the structured data guide increases. Therefore, it is preferable that the optimal number N of XML data items obtained from the unknown DB server 30 be set in advance considering the balance between the accuracy of a required structured data guide and the permissible processing time.

As the query expression for the unknown DB server 30, a query expression that certainly matches all data items from the root, such as /* which is a simple path expression of XQuery, may be used, similarly to the query expression executed by the first generating unit 11. However, in order to improve the efficiency or accuracy of query, it is preferable to use a query expression obtained by relaxing the conditions of the original query expression input from the input unit 13.

FIGS. 6A to 6E are diagrams illustrating an example of the process of generating the structured data guide for the unknown DB server 30 using the query expression obtained by relaxing the conditions of the original query expression input from the input unit 13. In this example, it is assumed that the original query expression input from the input unit 13 is a query expression A described with XQuery, as illustrated in FIG. 6A. A query expression having the structure of data as a condition, such as a query expression described with XQuery, is generally changed to a graph structure and is then processed. The query expression A illustrated in FIG. 6A is changed to a query graph illustrated in FIG. 6B and is then processed. In the query graph, a tag name is a node and constraint information, such as path constraint, is described at an arc. The query process extracts XML data satisfying the constraint of the query graph from the database (URL1) managed by the unknown DB server 30.

In this example, it is assumed that three XML data items, that is, document 1, document 2, and document 3 are stored in the database (URL1) managed by the unknown DB server 30, as illustrated in FIG. 6C, and XML data satisfying the constraint of the query graph among the XML data items is extracted. There is no hit for the original query expression A on URL1 due to a difference in structure. As illustrated in FIG. 6D, a relaxed query expression A' obtained by relaxing the conditions of the query expression A is generated. Various methods may be considered in order to generate the relaxed query expression A'. In this embodiment, a method of relaxing all constraint conditions for the structure except for the extraction conditions of text is used. As another method of relaxing the constraint conditions, for example, a relax method using the thesaurus information of a tag name or a method that does not relax the constraint conditions of a structure with high occurrence probability is considered.

When the relaxed query expression A' illustrated in FIG. 6D is executed on the unknown DB server 30 (URL1), it is possible to obtain XML data, such as document 1 and document 2. Then, when the XML data is analyzed, it is possible to generate a structured data guide, which is the virtual schema of the unknown DB server 30 (URL1), as illustrated in FIG. 6E.

In this embodiment, for simplicity, only three XML data items are stored in the database (URL1) managed by the unknown DB server 30 and two of the three XML data items are hit. However, in practice, XML data items more than three XML data items are generally stored in the database and the number of hits is more than that in this embodiment. Therefore, in order to reduce the processing time, the process stops when N pieces of XML data items, which are a designated number of XML data items (from the head), are acquired. In this case, unlike the structure in which /*, which is a simple path expression of XQuery, is used as the query expression, a solution space is narrowed to some extent. Therefore, it is possible to generate a high-accuracy structured data guide with a small number of data items, as compared to the structure that simply searches for data with /*. In addition, when the unknown DB server 30 discloses the structured data guide to the public in advance, the disclosed structured data guide may be acquired, instead of acquiring N pieces of XML data items from the unknown DB server 30 and generating the structured data guide, similarly to the process of the first generating unit 11.

The third generating unit 153 extracts the structured data guides stored in the first storage unit 12 among the structured data guides corresponding to each URL in the URL set input from the input unit 13 from the first storage unit 12. For the structured data guides that are not stored in the first storage unit 12, the structured data guides generated by the second generating unit 152 are acquired. The third generating unit 153 synthesizes a plurality of structured data guides corresponding to each URL in the URL set input from the input unit 13 to generate a synthesized structured data guide, as illustrated in FIG. 3.

The generated synthesized structured data guide is the virtual schema of an integrated database obtained by integrating a plurality of DB servers 30 to be queried. Therefore, even though a portion of the structural information of the DB server 30 to be queried is omitted, the omitted information is supplemented by the information of another DB server 30 having similar structural information, which results in high schema reproducibility. In addition, when a query for the DB server 30 is performed, the synthesized structured data guide is generated using the structured data guides stored in the first storage unit 12 or the structured data guides generated by the second generating unit 152 (that is, the synthesized structured data guide is dynamically generated). Therefore, the synthesized structured data guide responds to a change in the schema of the DB server 30 due to, for example, the addition or deletion of XML data to or from the database and accurately reproduces the schema of the integrated database that is changed from moment to moment.

The conversion unit 154 converts the original query expression input from the input unit 13 so as to be suitable for the synthesized structured data guide generated by the third generating unit 153 and generates a converted query expression. As described above, the synthesized structured data guide generated by the third generating unit 153 is information indicating the virtual schema of the integrated database and indicates a structure with a high occurrence probability on the plurality of DB server 30 to be queried, or information for which a similar structure is likely to be formed even though complete matching is not obtained. When there is a database having the above-mentioned structured data guide, the conversion unit 154 converts the original query expression input from the input unit 13 such that the possibility of matching increases.

An example of the process of the conversion unit 154 will be described with reference to FIG. 7. In the example illustrated in FIG. 7, the original query expression input from the input unit 13 is /A/B/C and a matching process is performed on the synthesized structured data guide. First, when the original query expression /A/B/C is used as a matching condition, there is no direct matching path on the synthesized structured data guide. Thus, the original query expression is converted. This method is a combination optimizing problem, but is solved by a heuristic method in practice. For example, a method is considered in which a score is reduced whenever a certain constraint condition is relaxed and a combination is determined such that the highest score is obtained.

The constraint condition is relaxed, for example, (1) when/ is relaxed to //, (2) when an unknown element is newly added, (3) when elements in the same structure are connected to each other by OR. In this case, the constraint relaxation cost of (1) is 3, the constraint relaxation cost of (2) is 7, and the constraint relaxation cost of (3) is 5. In addition, the initial score of the original query expression is 100. The constraint conditions of (1) to (3) are relaxed to generate the candidates of the converted query expression matched with the synthesized structured data guide and each constraint relaxation cost is subtracted from the initial score of the original query expression to calculate the scores of the candidates of the converted query expression. Then, the candidate of the converted query expression with the highest score is selected and used as the converted query expression.

In the example illustrated in FIG. 7, /A//B/C obtained by applying the constraint relaxation rule of (1) to the original query expression is given as one of the candidates of the converted query expression. The score of the candidate /A//B/C of the converted query expression is 100−3=97. In addition, /A/G/B/C obtained by applying the constraint relaxation rule of (2) to the original query expression is one of the candidates of the converted query expression since there is a path to be matched on the structured data guide. The score of the candidate /A/G/B/C of the converted query expression is 100−7=93. Furthermore, /A/(B|C|D)/C obtained by applying the constraint relaxation rule of (3) to the original query expression is one of the candidates of the converted query expression. The score of the candidate /A/(B|C|D)/C of the converted query expression is 100−5=95.

Among the three candidates of the converted query expression, /A//B/C obtained by applying the constraint relaxation rule of (1) to the original query expression has the highest score. Therefore, the conversion unit 154 selects /A//B/C as the converted query expression from these candidates, converts the original query expression /A/B/C input from the input unit 13 into /A//B/C, and transmits the converted query expression to the output unit 14. In this way, the output unit 14 outputs /A//B/C, which is the query expression converted so as to be suitable for the synthesized structured data guide for the plurality of DB servers 30 to be queried, to the client terminal 20.

Figure 8:
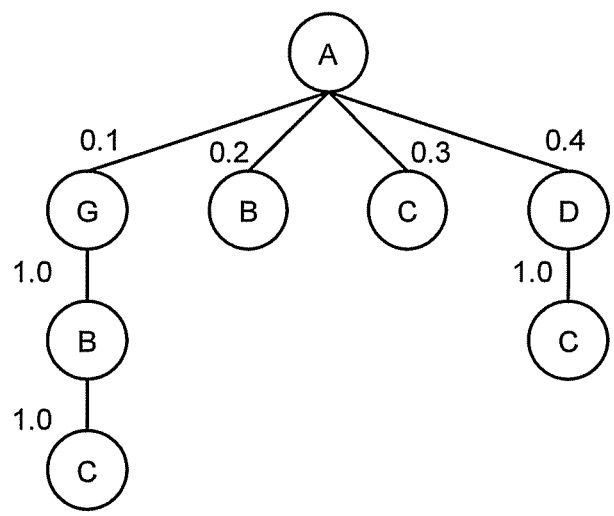
FIG. 8 is a diagram illustrating an example a synthesized structured data guide to which information about the probability of connection between elements is added.

Incidentally, the synthesized structured data guide or the individual structured data guide, which is a source of the synthesized structured data guide, is basically generated by superposition. Therefore, as illustrated in FIG. 8, for example, the probability of connection between elements may be added as information to the synthesized structured data guide or the individual structured data guide. Information which indicates the probability of connection between elements and is added to the synthesized structured data guide or the individual structured data guide may be used to give the scores to the candidates of the converted query expression in the conversion unit 154. For example, as illustrated in FIG. 8, when it is known that an element B is present with a probability of 0.2 and an element C is present with a probability of 0.3 immediately below an element A, it is considered that the score of a candidate /A/C of the converted query expression is more than that of a candidate /A/B of the converted query expression.

Figure 9:
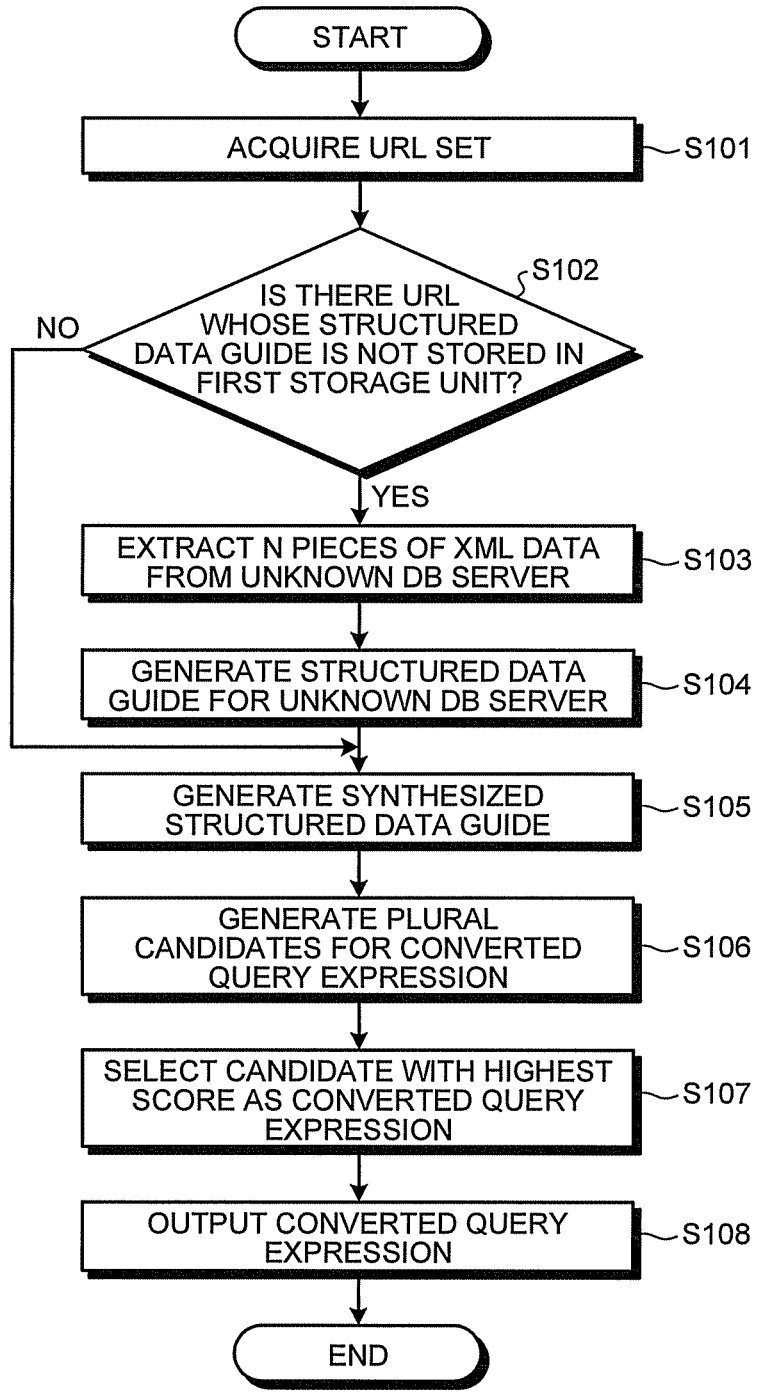
FIG. 9 is a flowchart illustrating the flow of a series of processes performed by a query expression conversion unit.

Next, the operation of the query expression conversion apparatus 10 according to the first embodiment will be described with reference to FIG. 9. FIG. 9 is a flowchart illustrating the flow of a series of processes performed by the query expression conversion processing unit 15 when the input unit 13 receives the URL set and the original query expression from the client terminal 20. In the query expression conversion apparatus 10 according to the first embodiment, as a routine which is separated from the process of the query expression conversion processing unit 15 illustrated in FIG. 9, the first generating unit 11 periodically performs crawling on a known DB server 30 and the latest structured data guide of the known DB server 30 at the time when the input unit 13 inputs the URL set and the original query expression is stored in the first storage unit 12.

When the process illustrated in the flowchart of FIG. 9 starts, first, the URL set is input from the client terminal 20 to the URL checking unit 151 of the query expression conversion processing unit 15 (Step S101). The URL checking unit 151 searches the first storage unit 12 using each URL included in the input URL set as a key and determines whether there is a URL whose structured data guide is not stored in the first storage unit 12 (Step S102).

When there is a URL whose structured data guide is not stored in the first storage unit 12 (Step S102: Yes), that is, when the URL of an unknown DB server 30 is included in the URL set in the query expression conversion apparatus 10, the second generating unit 152 accesses the unknown DB server 30 and extracts N pieces of XML data items from the unknown DB server 30 (Step S103). Then, the second generating unit 152 analyzes the extracted N pieces of XML data items and generates a structured data guide for the unknown DB server 30 (Step S104). If the unknown DB server 30 discloses the structured data guide to the public, the second generating unit 152 acquires the disclosed structured data guide.

On the other hand, when there is no URL whose structured data guide is not stored in the first storage unit 12 (Step S102: No), that is, when all of the URLs in the URL set are the URLs of the known DB servers 30 registered in the query expression conversion apparatus 10 and the first generating unit 11 periodically performs crawling to generates the structured data guides, the process proceeds to Step S105.

Then, the third generating unit 153 acquires the structured data guide for the known DB server 30 which is stored in the first storage unit 12 and the structured data guide generated by the second generating unit 152 when there is an unknown DB server 30 and synthesizes the structured data guides corresponding to all of the URLs included in the URL set to generate a synthesized structured data guide, which is the virtual schema of an integrated database obtained by integrating all of the DB servers 30 to be queried (Step S105).

Then, the conversion unit 154 acquires the original query expression input from the client terminal 20 and performs matching with the synthesized structured data guide while relaxing the constraint conditions of the original query expression and generates a plurality of candidates of the converted query expression whose constraint conditions are relaxed (Step S106). In this case, the conversion unit 154 gives scores corresponding to the relaxation levels of the constraint conditions to the plurality of generated candidates of the converted query expression. Then, the conversion unit 154 selects the candidate with the highest score as the converted query expression from the plurality of generated candidates of the converted query expression (Step S107). The converted query expression is transmitted from the conversion unit 154 to the output unit 14 and is then output from the output unit 14 to the client terminal 20 (Step S108).

In the flowchart illustrated in FIG. 9, it is assumed that the structured data guides stored in the first storage unit 12 do not vary during the process. However, since the crawling of the first generating unit 11 is performed as a separate routine, the structured data guides corresponding to some URLs in the URL set may be updated during the process. In this case, it is preferable that, at that time, the third generating unit 153 generate the synthesized structured data guide using the updated structured data guides. In this way, it is possible to convert the original query expression using the synthesized structured data guide corresponding to the latest state of the DB server 30 to be queried and thus improve the accuracy of conversion.

In the above-described embodiment, the conversion unit 154 converts the original query expressions into one converted query expression. However, the conversion unit 154 may generate the converted query expression for each URL included in the URL set. In this case, when relaxing the constraint conditions of the original query expression to calculate matching with the synthesized structured data guide, the conversion unit 154 may select a different converted query expression for each URL, considering matching with the structured data guides corresponding to each URL, using, for example, a method of increasing the scores of the candidates of the converted query expression matched with the corresponding structured data guides.

As described in detail above, for the known DB server 30, the query expression conversion apparatus 10 according to the first embodiment periodically performs crawling to generate a structured data guide, which is a virtual schema, and stores the structured data guide in the first storage unit 12. In addition, for the unknown DB server 30, the query expression conversion apparatus 10 generates a structured data guide, which is a virtual schema when the original query expression is converted. Then, the query expression conversion apparatus 10 converts the original query expression input from the client terminal 20 using these structured data guides and outputs the converted query expression to the client terminal 20. Therefore, it is possible to appropriately convert the query expression so as to be suitable for the DB server 30 to be queried, without defining the conversion rule according to the schema for each DB server 30 on the network. In addition, it is possible to respond to the DB server 30 whose schema is unknown.

When there is a plurality of DB servers 30 to be queried, the query expression conversion apparatus 10 according to the first embodiment synthesizes the structured data guides for the plurality of DB servers 30 to generate a synthesized structured data guide, which is the virtual schema of an integrated database obtained by integrating the plurality of DB servers 30. Then, the query expression conversion apparatus 10 converts the original query expression input from the client terminal 20 so as to be suitable for the synthesized structured data guide. Even though a portion of the structural information of the DB server 30 to be queried is omitted, the omitted structural information is supplemented by the information of another DB server 30 with similar structural information. Therefore, it is possible to obtain the converted query expression effective for all of the DB servers 30 to be queried and thus improve the search accuracy of an integrated search system.

(Second Embodiment)

Next, a query expression conversion apparatus according to a second embodiment will be described. The query expression conversion apparatus according to the second embodiment has a function of giving scores to a plurality of candidates of a converted query expression using the history of the previous query expression conversion process. That is, in the query expression conversion apparatus according to the second embodiment, the converted query expression for the original query expression which is obtained by the previous convert process and the score given to the converted query expression are stored, and scores are given to a plurality of candidates of the converted query expressions in the next conversion process, considering the stored score.

Figure 10:
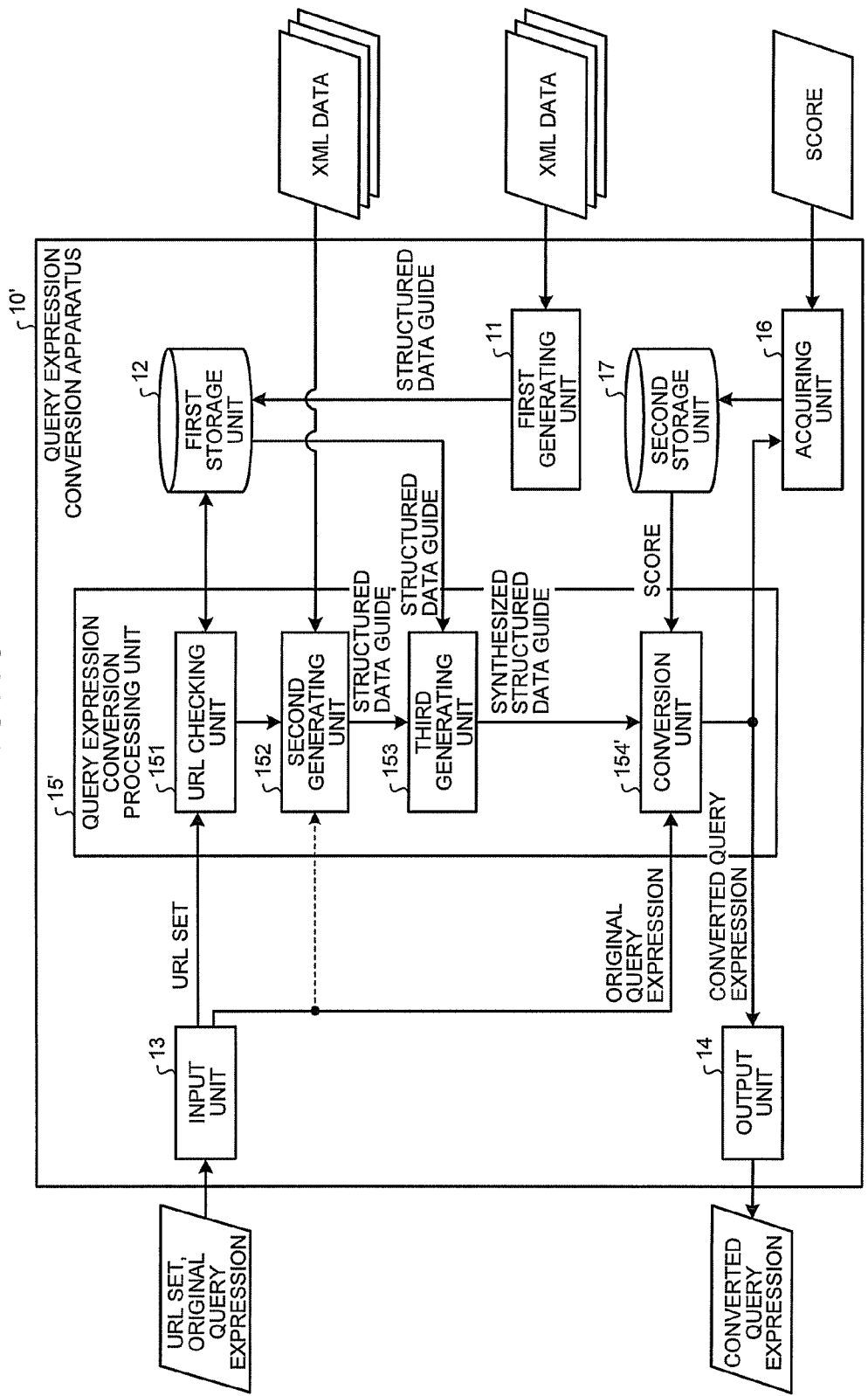
FIG. 10 is a functional block diagram illustrating the functional structure of a query expression conversion apparatus according to a second embodiment.

FIG. 10 is a functional block diagram illustrating the functional structure of a query expression conversion apparatus 10' according to the second embodiment. The query expression conversion apparatus 10' according to the second embodiment differs from the structure of the query expression conversion apparatus 10 (see FIG. 5) according to the first embodiment in that an acquiring unit 16 and a second storage unit 17 are further included. The other structures are the same as those in the first embodiment. Therefore, in the following description, the same components as those in the first embodiment are denoted by the same or similar reference numerals and a description thereof will be omitted. Hereinafter, the characteristic structure of the second embodiment will be described.

The acquiring unit 16 acquires a score to which the user's evaluation of the converted query expression output from the output unit 14 is reflected. Specifically, the acquiring unit 16 provides an input means (for example, which is represented by a GUI) for inputting the score of the converted query expression to the client terminal 20 in operative association with, for example, the output of the converted query expression from the output unit 14 to the client terminal 20. When the user uses the input means to input the score to which the evaluation of the converted query expression is reflected, the acquiring unit 16 acquires the input score. The acquiring unit 16 stores the acquired score in the second storage unit 17 so as to be associated with the converted query expression.

The second storage unit 17 is a memory that stores the converted query expression which has been previously converted from a certain query expression by the conversion unit 154' and the score given to the converted query expression. Whenever the converted query expression is output from the output unit 14 to the client terminal 20, a predetermined score is given to the converted query expression and the second storage unit 17 stores the converted query expression and the score. When the converted query expression is repeatedly output plural times, the score of the converted query expression stored in the second storage unit 17 increases as the number of times the converted query expression is output increases. That is, the score of the previous converted query expression stored in the second storage unit 17 increases as the number of times the previous converted query expression is output increases.

As described above, when the acquiring unit 16 acquires the score to which the user's evaluation of the converted query expression is reflected, the score of the converted query expression stored in the second storage unit 17 is rewritten by the score to which the user's evaluation of the converted query expression is reflected. That is, when the user evaluates the converted query expression, the score of the previous converted query expression stored in the second storage unit 17 increases as the evaluation score by the user increases. In this embodiment, the score of the converted query expression stored in the second storage unit 17 is rewritten by the score acquired by the acquiring unit 16, considering the user's evaluation of the converted query expression as a main factor. However, when the user evaluates the converted query expression, the score acquired by the acquiring unit 16 may be added to the score of the converted query expression stored in the second storage unit 17.

In the query expression conversion apparatus 10' according to the second embodiment, the conversion unit 154' of the query expression conversion processing unit 15' generates a plurality of candidates of the converted query expression using matching with the synthesized structured data guide while relaxing the constraint conditions of the original query expression and selects the candidate with a high score from the plurality of candidates of the converted query expression, similarly to the first embodiment. In this case, the conversion unit 154' gives scores to the generated candidates of the converted query expression using the information stored in the second storage unit 17. That is, when giving scores to plural generated candidates of the converted query expression, the conversion unit 154' uses the scores corresponding to the relaxation levels of the constraint conditions and the scores given to the candidates of the converted query expression which is converted from the same query expression stored in the second storage unit 17.

Figure 11:
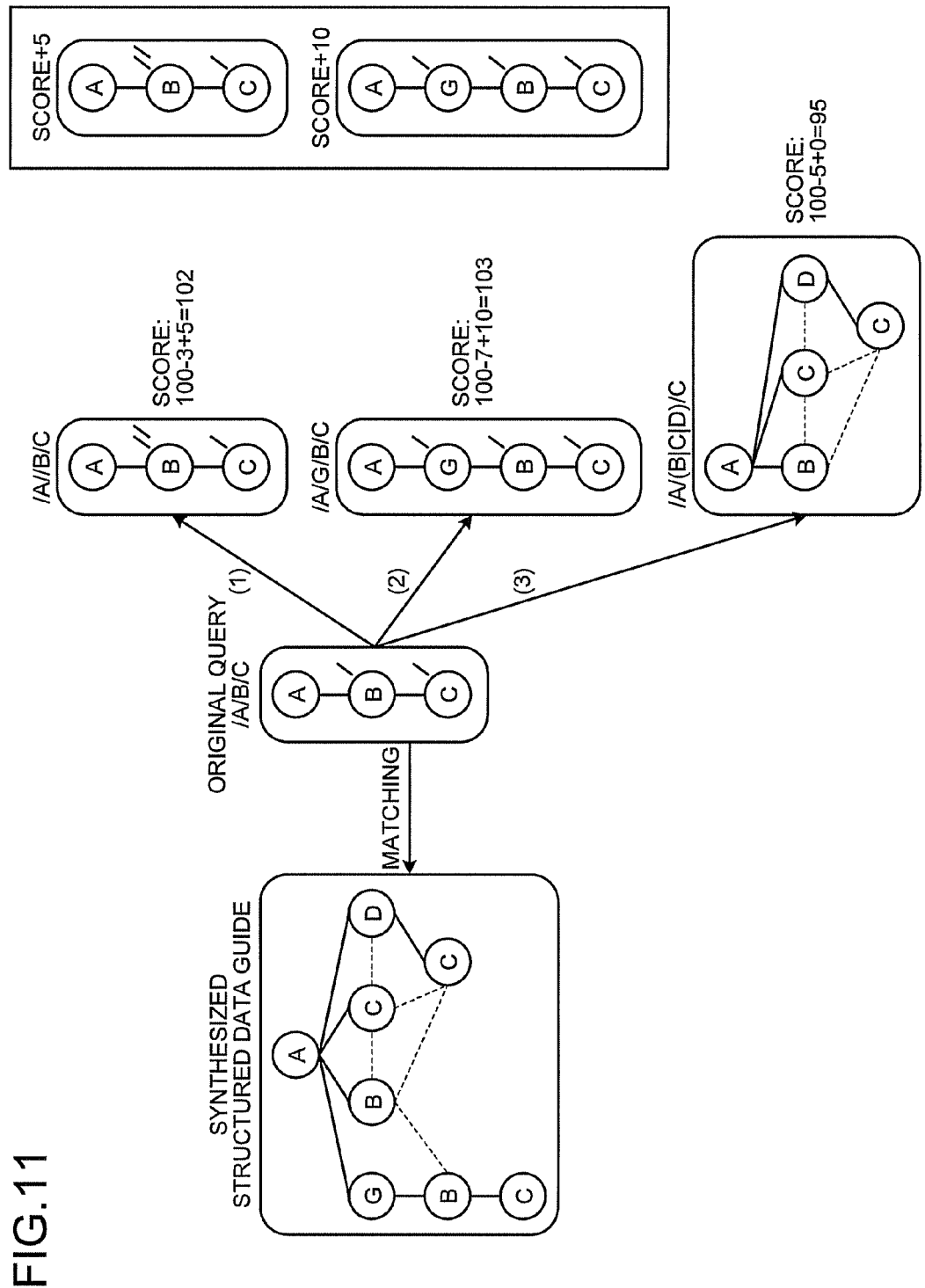
FIG. 11 is a diagram illustrating an example of the process of a conversion unit.

FIG. 11 is a diagram illustrating an example of the process of the conversion unit 154' of the query expression conversion apparatus 10' according to the second embodiment. FIG. 11 illustrates an example in which the original query expression is converted under the same conditions as those in the example illustrated in FIG. 7. That is, the original query expression input from the input unit 13 is /A/B/C. The constraint conditions are relaxed, for example, (1) when/is relaxed to //, (2) when an unknown element is newly added, and (3) when elements in the same structure are connected to each other by OR. In this case, the constraint relaxation cost of (1) is 3, the constraint relaxation cost of (2) is 7, and the constraint relaxation cost of (3) is 5. In addition, the initial score of the original query expression is 100.

In the example illustrated in FIG. 11, a query expression /A//B/C obtained by applying the constraint relaxation rule of (1) to the original query expression has been previously selected as the converted query expression, is given a score of +5, and is stored in the second storage unit 17. A query expression /A/G/B/C obtained by applying the constraint relaxation rule of (2) to the original query expression has been previously selected as the converted query expression plural times, is given a score of +10, and is stored in the second storage unit 17. A query expression /A/(B|C|D)/C obtained by applying the constraint relaxation rule of (3) to the original query expression has not been previously selected as the converted query expression and is not stored in the second storage unit 17.

In this case, the score of the query expression /A//B/C obtained by applying the constraint relaxation rule of (1) to the original query expression is 100−3+5=102. In addition, the score of the query expression /A/G/B/C obtained by applying the constraint relaxation rule of (2) to the original query expression is 100−7+10=103. Furthermore, the score of the query expression /A/(B|C|D)/C obtained by applying the constraint relaxation rule of (3) to the original query expression is 100−5+0=95. Among the three candidates of the converted query expression, the converted query expression /A/G/B/C obtained by applying the constraint relaxation rule of (2) to the original query expression has the highest score. Therefore, the conversion unit 154' selects the converted query expression /A/G/B/C from these candidates and converts the original query expression /A/B/C input from the input unit 13 into /A/G/B/C.

As described above, the query expression conversion apparatus 10' according to the second embodiment stores the query expression converted from the original query expression by the previous conversion process and the score given to the converted query expression in the second storage unit 17, and the conversion unit 154' gives scores to a plurality of candidates of the converted query expression in the subsequent conversion process, considering the score stored in the second storage unit 17. Therefore, the conversion accuracy of the query expression is improved by a learning effect whenever the process is performed and it is possible to improve the search accuracy of an integrated search system.

In addition, in the query expression conversion apparatus 10' according to the second embodiment, the acquiring unit 16 acquires the score to which the evaluation of the converted query expression by the user is reflected and the score is stored in the second storage unit 17. Therefore, it is possible to feed back the user's evaluation of the converted query expression and convert the query expression. As a result, it is possible to interactively improve the conversion accuracy of the query expression.

The query expression conversion apparatus 10 according to the first embodiment and the query expression conversion apparatus 10' according to the second embodiment have been described above. Each of the query expression conversion apparatuses 10 and 10' has a hardware structure that includes a control device, such as a CPU, a storage device, such as ROM or RAM, and an external storage device, such as an HDD or CD drive, and uses a general computer. Functional structures, such as the first generating unit 11, the input unit 13, the output unit 14, the URL checking unit 151, the second generating unit 152, the third generating unit 153, the conversion unit 154 (conversion unit 154'), and the acquiring unit 16, may be implemented by a query expression conversion program executed by a computer. In addition, the first storage unit 12 and the second storage unit 17 may be implemented by storage devices or external storage devices.

The query expression conversion program executed by the query expression conversion apparatuses 10 and 10' is recorded as a file of an installable format or an executable format on a computer-readable recording medium, such as a CD-ROM, a flexible disk (FD), a CD-R, or a DVD (Digital Versatile Disk), and is then provided.

The query expression conversion program executed by the query expression conversion apparatuses 10 and 10' may be stored in a computer that is connected to a network, such as the Internet, may be downloaded through the network, and may be provided. In addition, the query expression conversion program executed by the query expression conversion apparatuses 10 and 10' may be provided or distributed through a network, such as the Internet. Furthermore, the query expression conversion program executed by the query expression conversion apparatuses 10 and 10' may be incorporated into, for example, ROM in advance and then provided.

The query expression conversion program executed by the query expression conversion apparatuses 10 and 10' has a module structure including the above-mentioned units (the first generating unit 11, the input unit 13, the output unit 14, the URL checking unit 151, the second generating unit 152, the third generating unit 153, the conversion unit 154 (conversion unit 154'), and the acquiring unit 16). As the actual hardware, a CPU (processor) reads the query expression conversion program from the above-mentioned storage medium and executes the query expression conversion program. Then, the above-mentioned units are loaded to a main storage device, and the first generating unit 11, the input unit 13, the output unit 14, the URL checking unit 151, the second generating unit 152, the third generating unit 153, the conversion unit 154 (conversion unit 154'), and the acquiring unit 16 are generated on the main storage device.

As described in detail above, according to the query expression conversion apparatus 10 of the first embodiment and the query expression conversion apparatus 10' of the second embodiment, it is possible to appropriately convert a query expression so as to be suitable for each DB server 30 to be queried, without defining a conversion rule according to the schema of each DB server 30 on the network in advance. In addition, it is possible to respond to the DB server 30 whose schema is unknown.

The above-described embodiments are examples of applications to the integrated search system. However, the embodiments can be effectively applied to a case in which a search is performed for one database. In this case, the query expression conversion apparatus acquires a structured data guide for the database to be queried and converts the original query expression so as to be suitable for the structured data guide. In this way, it is possible to appropriately convert the original query expression, without defining a conversion rule according to the schema of the database to be queried in advance.

In the above-described embodiments, XML data is given as an example of the structured data, but the embodiments is not limited to the XML data. The embodiments can be widely applied to a case that treats the same structured data. In the above-described embodiments, the query expression conversion apparatus is a server on the network and searches the databases on the network. However, the embodiments can be effectively applied to a case in which the query expression conversion apparatus searches for a data set distributed in one apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A query expression conversion apparatus that converts a user query expression for a data set storing structured data, comprising:
    a first generating unit that acquires the structured data from a known data set, which is a data set whose unique address has been registered, by performing a pre-determined query expression against a known data set and generates a structured data guide of the known data set by analyzing the structured data that is acquired from the known data set, the structured data guide virtually representing schema of the data set;
    a first storage unit that stores the structured data guide of the known data set generated by the first generating unit in association with the unique address of the known data set;
    an input unit that inputs a unique address of a data set to be queried and the user query expression having the structure of data as a condition;
    a second generating unit that, when a structured data guide corresponding to the input unique address is not stored in the first storage unit, acquires a designated number of structured data items from the data set to be queried that is identified by the input unique address and generates a structured data guide of the data set to be queried by analyzing the structured data items that are acquired from the data set to be queried;
    a conversion unit that converts the input user query expression so as to be suitable for the structured data guide corresponding to the input unique address and
    an output unit that outputs the converted user query expression converted by the conversion unit.

2. The apparatus according to claim 1,
    wherein when the structured data guide corresponding to the input unique addressed is not stored in the first storage unit, the second generating unit acquires the structured data items from the data set to be queries using a query expression obtained by relaxing the condition of the input user query expression.

3. The apparatus according to claim 1, further comprising:
    a third generating unit that, when the input unit inputs a plurality of unique addresses, synthesizes a plurality of structured data guides, each corresponding to one of the input unique addresses to generate a synthesized structured data guide,
    wherein the conversion unit converts the input user query expression so as to be suitable for the synthesized structured data guide.

4. The apparatus according to claim 1,
    wherein the conversion unit relaxes the condition of the input user query expression so as to be suitable for the structured data guide corresponding to the input unique address and generates a plurality of candidates of the converted user query expression, gives scores corresponding to the relaxation levels of the condition to the plurality of generated candidates of the converted user query expression, and selects at least one of the plurality of candidates of the converted user query expression on the basis of the evaluation of the scores.

5. The apparatus according to claim 4,
wherein information indicating the probability of connection between elements of the structured data guide is added to the structured data guide, and
the conversion unit gives scores corresponding to the relaxation levels of the condition and the probability of the connection between the elements to the plurality of generated candidates of the converted user query expression.

6. The apparatus according to claim 4, further comprising:
a second storage unit that stores the converted user query expression and the score given to the converted user query expression,
wherein the conversion unit gives scores, based on the scores corresponding to the relaxation levels of the condition and the score given to the converted user query expression stored in the second storage unit, to the candidate among the plurality of generated candidates of the converted user query expression, which is matched with the converted user query expression stored in the second storage unit.

7. The apparatus according to claim 6, further comprising:
an acquiring unit that acquires a score to which the user's evaluation of the converted user query expression output from the output unit is reflected and stores the score in the second storage unit.

8. The apparatus according to claim 1,
wherein the query expression conversion apparatus is a server on a network,
the first generating unit accesses the known data set on the network and generates the structured data guide of the known data set,
the first storage unit stores the structured data guide of the known data set generated by the first generating unit in association with a URL, which is the unique address of the known data set,
the input unit receives a URL, which is the unique address of the data set to be queried, and the user query expression having the structure of data as a condition from a client terminal on the network,
when the structured data guide corresponding to the received URL is not stored in the first storage unit, the second generating unit accesses data set to be queried that is identified by the received URL on the network and generates the structured data guide of the data set to be queried, and
the output unit outputs the converted user query expression converted by the conversion unit to the client terminal.

9. A query expression conversion method that converts a user query expression for a data set storing structured data, comprising:
acquiring the structured data from a known data set, which is a data set whose unique address has been registered, by performing a pre-determined query expression against the known data set and generating a structured data guide of the known data set by analyzing the structured data that is acquired from the known data set, the structured data guide virtually representing schema of the data set;
storing the structured data guide of the known data set in a memory in association with the unique address of the known data set;
inputting a unique address of a data set to be queried and the user query expression having the structure of data as a condition;
acquiring, when a structure data guide corresponding to the input unique address is not stored in the memory, a designated number of structured data items from the data set to be queried that is identified by the input unique address and generating a structured data guide of the data set to be queried by analyzing the structured data items that are acquired from the data set to be queried;
converting the input user query expression so as to be suitable for the structured data guide corresponding to the input unique address; and
outputting the converted user query expression.

10. A computer program product having a non-transitory computer readable medium including programmed instructions for converting a user query expression, wherein the instructions, when executed by a computer, cause the computer to perform:
acquiring structured data from a known data set, which is a data set whose unique address has been registered, by performing a pre-determined query expression against the known data set and generating a structured data guide of the known data set by analyzing the structured data that is acquired from the known data set, the structured data guide virtually representing schema of the data set;
storing the structured data guide of the known data set in a memory in association with the unique address of the known data set;
inputting a unique address of a data set to be queried and the user query expression having the structure of data as a condition;
acquiring, when a structured data guide corresponding to the input unique address is not stored in the memory, a designated number of structured data items from the data set to be queried that is identified by the input unique address and generating a structured data guide of the data set to be queried by analyzing the structured data items that are acquired from the data set to be queried;
converting the input user query expression so as to be suitable for the structured data guide corresponding to the input unique address; and
outputting the converted user query expression.

* * * * *